(No Model.)
J. MORROW.
COLLAR SUPPORTING PAD FOR DRAFT ANIMALS.
No. 363,962. Patented May 31, 1887.
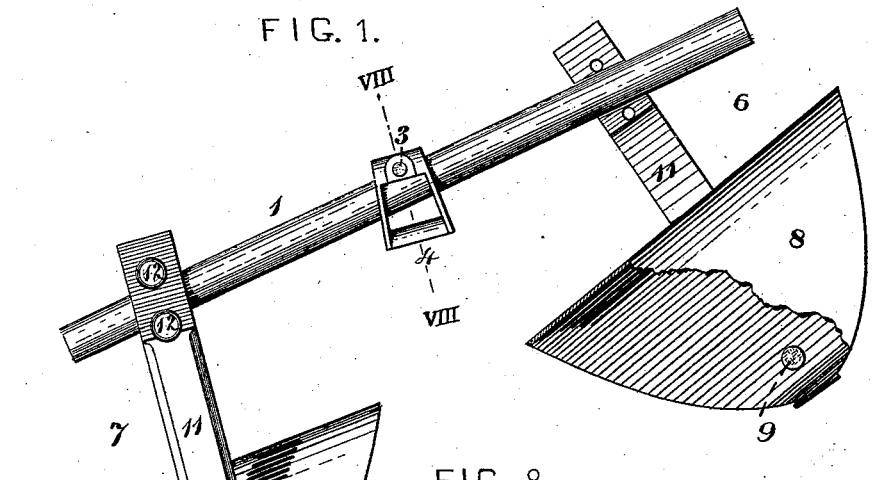
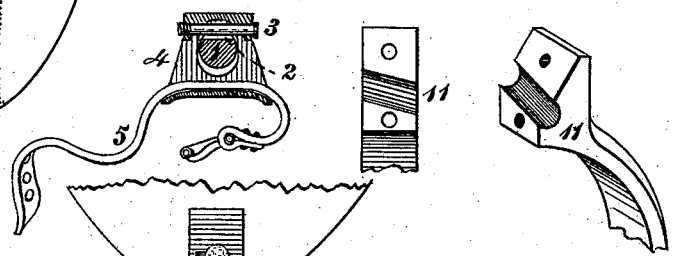
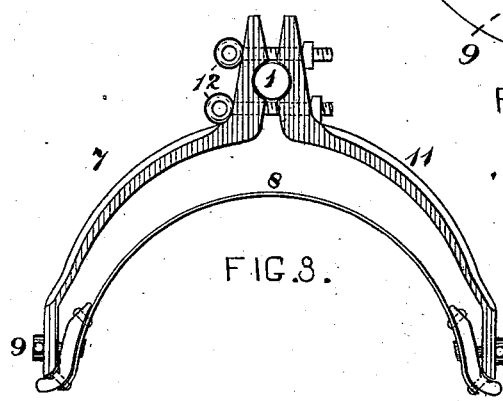
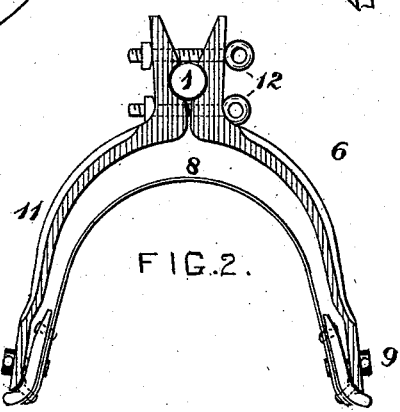
ATTEST  
INVENTOR  
James Morrow  
BY Knight Bros.  
ATT'YS

UNITED STATES PATENT OFFICE.

JAMES MORROW, OF WASHINGTON COURT-HOUSE, OHIO, ASSIGNOR OF TWO-THIRDS TO RICHARD H. MORROW, OF SAME PLACE, AND GEORGE W. MORROW, OF STEUBENVILLE, OHIO.

COLLAR-SUPPORTING PAD FOR DRAFT-ANIMALS.

SPECIFICATION forming part of Letters Patent No. 363,962, dated May 31, 1887.

Application filed January 6, 1887. Serial No. 223,601. (No model.)

*To all whom it may concern:*

Be it known that I, JAMES MORROW, of Washington Court-House, Fayette county, Ohio, have invented a new and useful Collar-Supporting Pad for Draft-Animals, of which the following is a specification.

My invention relates to a device to prevent injurious contact of the collar with the neck-crease of a draft horse or mule, and especially to relieve from such contact the neck of an animal which has already been collar-chafed.

This device, called by me a "bridge-pad," comprises two saddle-formed bearing-pieces whose structure and mode of attachment are such as by upholding the collar to relieve the galled part without interfering with the animal's motions. The structure of the device is such as to be readily adjusted to different animals.

In the accompanying drawings, Figure 1 is a side elevation of a bridge-pad, illustrating my invention, a portion of the front bearing-plate being broken away. Figs. 2 and 3 are respectively transverse elevations of the front and rear bearing-pieces with their yokes and the supporting-bar. Figs. 4 and 5 are respectively an inside elevation and a perspective view of one of the component arms of such yoke at its upper end. Fig. 6 shows part of a bearing-plate and one of the two buttons which fasten and pivot it to the yoke. Fig. 7 is a side view of the supporting-bar. Fig. 8 is a section on the line VIII VIII.

1 represents a rod or bar, preferably composed of steel, and known in this specification as the "supporting-bar." A nick, 2, formed transversely in said bar at or about its mid-length, receives and supports the fulcrum 3 of a stirrup, 4, that holds a strap, 5, which, having been engaged in the upper part of the animal's collar, holds the collar suspended out of contact with its neck.

6 7 are two bearing-pieces, which, when the device is in use, rest, respectively, upon the animal's neck and withers. The said bearing-pieces being of substantially identical construction, the following description is applicable to either:

8 is a bearing-plate consisting of a piece of sheet metal cut and bent as represented, so as to fit snugly and rest upon the neck (or withers) of the animal. The concave surface of said plate may be lined, padded, or quilted with leather or other suitable material.

Two studs or buttons, 9, riveted to the lower parts of said plate, being engaged within orifices 10 in the lower extremities of yoke 11, attached by bolts 12 to the bar 1, operate to support said bar in the manner shown.

The represented construction of the said yokes and supporting-bar and the described pivoted attachment of the curved bearing-plates to their respective yokes enables discretionary adjustment of the longitudinal distance and of the spread or straddle of the said bearing-pieces to fit any given animal, and self-adjustment of the slope or inclination of each respective bearing-plate to conform to every changing posture and motion of the animal.

I claim as new and of my invention—

1. The duplex or bridge pad for draft-animals, having the two distinct saddle-formed bearing-pieces 6 7, attached by longitudinally-adjustable yokes 11 to the ends of a bar, 1, provided at or about its mid-length with means for suspending the collar, substantially as and for the purpose set forth.

2. The described combination of the bar 1, the yokes 11, and the bolts 12, whereby the bearing-pieces are made capable of relative adjustment as to distance and of individual adjustment as to spread or straddle, as and for the purposes set forth.

3. The described combination of the curved bearing-plate 8, having the detachable pivoted attachment 9, and the yoke 11, whereby the said bearing-plate is rendered self-adjusting to the animal's postures and motions, as and for the purpose set forth.

4. The described combination of the stud projections 9 with the removable bearing-plates 8 and the perforated yokes 11, serving the double function of fastenings and pivots, as and for the purposes set forth.

5. The described combination, for the purposes set forth, of the nicked supporting-bar 1, the strap-supporting stirrup 4, and the two bearing-pieces 6 7, each consisting of curved bearing-plates 8, pivot-fastenings 9, yoke 11, and bolts 12, as set forth.

In testimony of which invention I hereunto set my hand.

JAMES MORROW.

Attest:
ALEXIS HOPE,
CHARLES S. FAY.